(12) United States Patent
Amakawa et al.

(10) Patent No.: US 8,965,098 B2
(45) Date of Patent: Feb. 24, 2015

(54) CELL-IMAGE ANALYZING APPARATUS

(75) Inventors: Genta Amakawa, Hachioji (JP); Kosuke Takagi, Kawagoe (JP); Yuichiro Matsuo, Hachioji (JP)

(73) Assignee: Olympus Corporation, Tokyo (JP)

( * ) Notice: Subject to any disclaimer, the term of this patent is extended or adjusted under 35 U.S.C. 154(b) by 917 days.

(21) Appl. No.: 12/724,753

(22) Filed: Mar. 16, 2010

(65) Prior Publication Data
US 2010/0232674 A1    Sep. 16, 2010

(30) Foreign Application Priority Data
Mar. 16, 2009  (JP) .................................. 2009-062608

(51) Int. Cl.
  *G06K 9/00*        (2006.01)
(52) U.S. Cl.
  CPC ................................. *G06K 9/00134* (2013.01)
  USPC ......................................................... 382/133
(58) Field of Classification Search
  None
  See application file for complete search history.

(56) References Cited

U.S. PATENT DOCUMENTS

| | | | | |
|---|---|---|---|---|
| 6,716,588 B2* | 4/2004 | Sammak et al. | ............... | 435/7.2 |
| 7,711,174 B2* | 5/2010 | Sammak et al. | ............... | 382/133 |
| 7,796,815 B2* | 9/2010 | Muschler et al. | ............. | 382/173 |
| 7,907,769 B2* | 3/2011 | Sammak et al. | ............... | 382/133 |
| 7,920,736 B2* | 4/2011 | Sammak et al. | ............... | 382/133 |
| 7,936,939 B2* | 5/2011 | Ando et al. | .................... | 382/255 |
| 8,068,670 B2* | 11/2011 | Muschler et al. | ............. | 382/173 |
| 8,086,016 B2* | 12/2011 | Kobayashi et al. | ........... | 382/133 |
| 8,179,597 B2* | 5/2012 | Namba et al. | ................. | 359/383 |
| 2007/0206845 A1* | 9/2007 | Rao et al. | ...................... | 382/133 |
| 2011/0019897 A1* | 1/2011 | Takagi et al. | ................. | 382/133 |
| 2011/0075928 A1* | 3/2011 | Jeong et al. | ................... | 382/181 |

FOREIGN PATENT DOCUMENTS

| | | |
|---|---|---|
| JP | 2001-211896 A | 8/2001 |
| JP | 2004-354650 A | 12/2004 |
| JP | 2005-003909 A | 1/2005 |
| JP | 2006-271210 A | 10/2006 |
| JP | 2007-041510 A | 2/2007 |
| JP | 2008-005768 A | 1/2008 |

OTHER PUBLICATIONS

Kanji Yahiro: "Development of system for observation and evaluation of non-staining cells": Journal of Bioscience and Bioengineering: vol. 83. No. 9 (and English translation thereof).

* cited by examiner

*Primary Examiner* — Robert Morgan
*Assistant Examiner* — Michael Tomaszewski
(74) *Attorney, Agent, or Firm* — Holtz, Holtz, Goodman & Chick PC

(57) ABSTRACT

A cell-image analyzing apparatus includes: a cell imaging system having an imaging optical system and an image sensor, for imaging cells that exist in a vessel; a cell-image analyzer for automatically analyzing a predetermined characteristic quantity on the cells using a cell image captured via the cell imaging system, upon delimiting cell regions; and a cell-contour emphasizing system for automatically emphasizing contour portions of images of the cells that exist in the vessel, which is arranged at a shot position of the cell imaging system.

11 Claims, 9 Drawing Sheets

SAMPLE PREPARATION

CELL IMAGING FOR PLURAL VIEW FIELDS

ANALYSIS:DIVISION INTO INDIVIDUAL CELLS
(e.g.:RED→CELL 1,YELLOW→CELL 2)

STATISTICAL PROCESSING

|  | AREA |
|---|---|
| CELL 1 | 100 |
| CELL 2 | 80 |
| AVERAGE | 90 |

CELL CONTOUR

INTRACELLULAR ORGANELLE

CELL CONTOUR

FOCUS ON CELL CONTOUR
→ACCURATE RECOGNITION

FOCUS ON
INTRACELLULAR ORGANELLE
→FAILURE TO DIVIDE

FOCUS ON
INTRACELLULAR ORGANELLE
→MISRECOGNITION

FOCUS ON INTRACELLULAR ORGANELLE

IRRECOGNIZABLE

RECOGNITION OF ORGANELLES

MISREGOGNITION

FOCUS ON CELL-CONTOUR EMPHASIZING POINT

ACCURATE RECOGNITION

TILTED ILLUMINATION

"SHADOW" GROWS AS ILLUMINATION ANGLE IS CHANGED

ONE CELL     RECOGNIZED AS PLURALITY

TWO CELLS     RECOGNIZED AS SINGULARITY

FIG.14A
EXTRACT "LINES" FROM CELL IMAGE
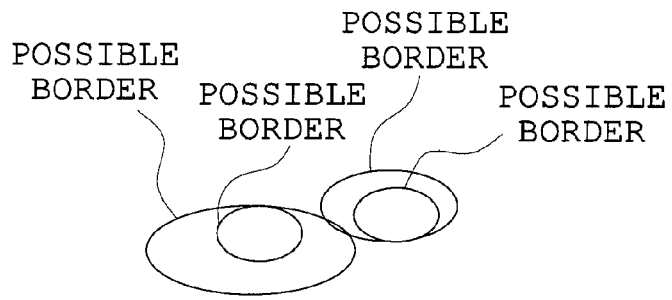
FIG.14B
"DIVIDE" INTO INDIVIDUAL CELLS
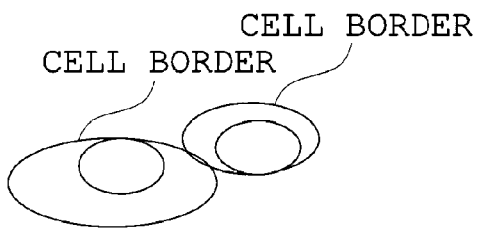
FIG.15
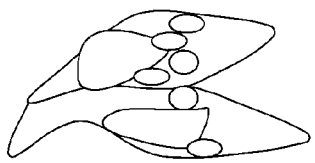
TOO MANY "LINE" COMPONENTS CONFUSE
CONTOUR BORDERS OF INDIVIDUAL CELLS
FIG.16A   FIG.16B
  
FRAGMENTED "LINE" COMPONENTS CONFUSE
WHICH ONES TO BE JOINED

CELL-IMAGE ANALYZING APPARATUS

This application claims benefits of Japanese Patent Application No. 2009-062608 filed in Japan on Mar. 16, 2009, the contents of which are hereby incorporated by reference.

BACKGROUND OF THE INVENTION

1) Field of the Invention

The present invention relates to a cell-image analyzing apparatus for imaging cells and analyzing characteristic quantities of the cells from captured images.

2) Description of Related Art

Cell analysis is indispensable for elucidation and therapy establishment of various diseases such as cancer. Therefore, a great deal of effort has been put into elucidation of states, kinetics, morphologies, properties etc. of cells upon isolation of cell strains. Also, fluorescent substances and luminescent substances have conventionally been used to facilitate delimitation of cells, particular proteins etc. in elucidation of the cells and the particular proteins.

Fluorescent substances and luminescent substances are easy to handle and thus are very effective means for delimiting cell themselves, particular proteins etc. On the other hand, however, fluorescent substances and luminescent substances sometimes behave as toxicants or stimulants for cells, specifically for living cells, to be a cause of precluding an accurate analysis result.

Therefore, in recent years, it is held to be very important to observe and analyze states, proliferation, morphologies etc. of cells under as natural a condition as possible without stimulating the cells via a fluorescent substance or a luminescent substance.

Conventionally, in a case where cells are observed and analyzed without being stimulated, a microscope such as recited in Japanese Patent Kokai No. 2004-354650 is used.

This microscope of JP Kokai No. 2004-354650 is provided with a light source, an illumination optical system for introducing light from the light source to an object for observation, an aperture arranged at the pupil position of the illumination optical system, and an observation optical system for observing, at a position displaced from the in-focus position, an image of the object illuminated by the light passing through the aperture.

Most of cells are colorless and transparent themselves. Therefore, in a case where cells are imaged via a normal observation technique using no fluorescent substance, even if automatic analysis of the cells from the captured image are attempted using an image analyzing apparatus, individual cells cannot be recognized, to make it difficult to obtain an accurate analysis result. By this reason, in cases where analysis is made without stimulating the cells, analysts would conventionally use a microscope as disclosed in JP Kokai No. 2004-354650, to visually observe states of the cells.

SUMMARY OF THE INVENTION

A cell-image analyzing apparatus according to the present invention includes: a cell imaging system having an imaging optical system and an image sensor, for imaging cells that exist in a vessel; and a cell-image analyzer for automatically analyzing a predetermined characteristic quantity on the cells using a cell image captured via the cell imaging system, upon delimiting cell regions; wherein the cell-image analyzing apparatus has a cell-contour emphasizing system for automatically emphasizing contour portions of images of the cells that exist in the vessel, which is arranged at a shot position of the cell imaging system.

In the cell-image analyzing apparatus according to the present invention, it is preferred that the cell-contour emphasizing system is constructed of a cell-contour emphasizing position focusing system for automatically adjusting a focus of the imaging optical system to a position where the contour portions of the images of the cells that exist in the vessel, which is arranged at the shot position of the cell imaging system, are emphasized.

In the cell-image analyzing apparatus according to the present invention, it is preferred that the cell-contour emphasizing system is constructed of a cell-contour emphasizing illumination system for illuminating the cells in such a manner that the contour portions of the images of the cells that exist in the vessel, which is arranged at the shot position of the cell imaging system, are emphasized.

In the cell-image analyzing apparatus according to the present invention, it is preferred that the cell-contour emphasizing system includes: a cell-contour emphasizing position focusing system for automatically adjusting a focus of the imaging optical system to a position where the contour portions of the images of the cells that exist in the vessel, which is arranged at the shot position of the cell imaging system, are emphasized; and a cell-contour emphasizing illumination system for illuminating the cells in such a manner that the contour portions of the images of the cells that exist in the vessel, which is arranged at the shot position of the cell imaging system, are emphasized.

In the cell-image analyzing apparatus according to the present invention, it is preferred that the cell-contour emphasizing position focusing system is configured so that the focus of the imaging optical system is first adjusted to an intracellular domain of the cells that exist in the vessel, which is arranged at the shot position of the cell imaging system, and then is shifted along an optical axis of the imaging optical system by a preset amount, to a position where the intracellular domain of the cells is blurred and the contour portions of the cells are distinctly seen in the cell image.

In the cell-image analyzing apparatus according to the present invention, it is preferred that the cell-contour emphasizing position focusing system is configured so that the focus of the imaging optical system is first adjusted to a bottom surface of the vessel, which is arranged at the shot position of the cell imaging system, and then is shifted along an optical axis of the imaging optical system by a preset amount, which is determined in accordance with a thickness of the cells that exist in the vessel.

In the cell-image analyzing apparatus according to the present invention, it is preferred that the cell-contour emphasizing illumination system is configured as a tilted illumination system.

The present invention provides a cell-image analyzing apparatus that makes it possible to automatically recognize individual cells accurately when used for cell images captured in an unstained, bright-field condition or for cell images captured from cells as living, to thereby greatly save fatigue of an analyst and time for processing in a cell analysis procedure. In addition, the capacity of accurate automatic recognition of individual cells may lead to discoveries of something new, for it allows us to carry out statistical data analysis, for which visual observation is insufficient in capacity. Further, since cells can be steadily recognized, elucidation of diseases and establishment of therapies would be accelerated through combining various cell analyses and carrying out new cell analyses one after another.

This and other objects as well as features and advantages of the present invention will become apparent from the following detailed description of the preferred embodiment when taken in conjunction with the accompanying drawings.

BRIEF DESCRIPTION OF THE DRAWINGS

FIGS. 14A-14B are explanatory diagrams that show the procedure of cytoplasm recognition by a cell-analyzing apparatus using a transmitted image of unstained cells, showing: a step of extracting possible borders as "lines"; and a step of determining contours of individual cells from the extracted possible borders of the cells; respectively.

FIG. 15 is an explanatory diagram that shows the first problem caused in recognition of cell regions in a case where cells are distinctly imaged in a transmitted image.

FIGS. 16A-16B are explanatory diagrams that show the second problem caused in recognition of cell regions in cases where cells are distinctly imaged in transmitted images, respectively.

DETAILED DESCRIPTION OF THE PREFERRED EMBODIMENTS

Preceding the explanation of the embodiment mode of the invention, the problem to be solved, the configuration, and the function and effect of the present invention will be explained.

Figure 1:
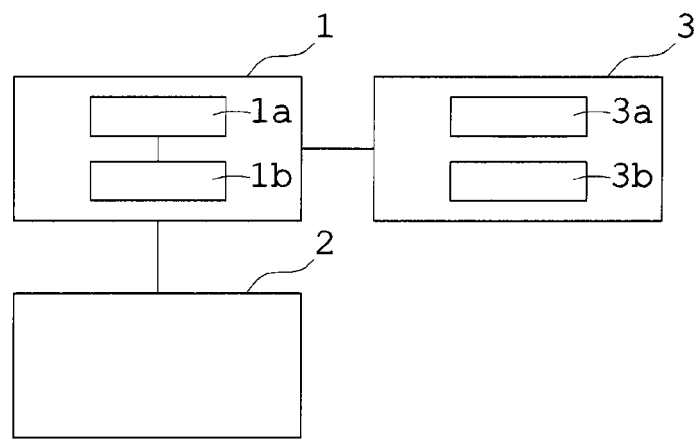
FIG. 1. is a block diagram that shows the schematic configuration of a cell-image analyzing apparatus according to the present invention.

FIG. 1 is a block diagram that shows the schematic configuration of a cell-image analyzing apparatus according to the present invention. The cell-image analyzing apparatus according to the present invention has a cell imaging system 1, a cell-image analyzer 2, and a cell-contour emphasizing system 3.

The cell imaging system 1 has an imaging optical system 1a and an image sensor 1b, to image cells existing in a vessel, which is not shown in FIG. 1 but is arranged at the shot position.

The cell-image analyzer 2 automatically analyzes a predetermined characteristic quantity on the cells using a cell image captured via the cell imaging system 1, upon delimiting cell regions.

The cell-contour emphasizing system 3 automatically emphasizes contour portions of images of the cells that exist in the vessel, which is arranged at the shot position of the cell imaging system 1.

The cell-contour emphasizing system 3 preferably is constructed of a cell-contour emphasizing position focusing system 3a for automatically adjusting a focus of the imaging optical system 1a to a preset position where the contour portions of the images of the cells that exist in the vessel, which is arranged at the shot position of the cell imaging system 1, are emphasized. Alternatively, the cell-contour emphasizing system 3 may be constructed of a cell-contour emphasizing illumination system 3b for illuminating the cells in such a manner that the contour portions of the images of the cells that exist in the vessel, which is arranged at the shot position of the cell imaging system 1, are emphasized. Alternatively, it is much preferable that the cell-contour emphasizing system 3 is provided with the cell-contour emphasizing position focusing system 3a and the cell-contour emphasizing illumination system 3b.

The cell-contour emphasizing position focusing system 3a is configured so that, in imaging cells via the cell imaging system 1, the focus of the imaging optical system 1a is displaced in the direction of the optical axis from a position of the intracellular domain (domain where organelles exist) to a preset position where the contours of the cells are emphasized. To be specific, the cell-contour emphasizing position focusing system 3a is configured so that, for example, the focus of the imaging optical system 1a is first adjusted to the intracellular domain of the cells that exist in the vessel, which is arranged at the shot position of the cell imaging system 1, and then is shifted along the optical axis of the imaging optical system 1a by a preset amount, to a position where the intracellular domain is blurred and the contour portions of the cells are distinctly seen in the cell image.

Alternatively, the cell-contour emphasizing position focusing system 3a is configured so that, for example, the focus of the imaging optical system 1a is first adjusted to the bottom surface of the vessel, which is arranged at the shot position of the cell imaging system 1, and then is shifted along the optical axis of the imaging optical system 1a by a preset amount, which is determined in accordance with a thickness of the cells that exist in the vessel. The cell-contour emphasizing illumination system 3b is configured as a tilted illumination system.

Conventionally, in a case where cells are analyzed with no stimulus being given by staining or the like, where cells are analyzed chronologically or where cells are analyzed as living in view of morphology or proliferation, an attempt to automatically analyze the cells from a captured image, which is obtained through imaging of the cells, by using an image analyzing apparatus has resulted in a failure to recognize cells because of colorlessness of the cells or has resulted in a failure to accurately recognize cells because a clustered state of cells, which often occurs in a cultivated condition, causes misrecognition of cell contours in an image.

Therefore, conventionally, in order to accurately analyze cells in an unstained condition, analysts have been obliged to adopt, not the automatic analysis of cell images via an image analyzing apparatus, but the method of analysis in which individual cells are visually recognized in microscopy. These analyses usually are conducted by analysts through their eyes for counting cells, measuring cell growth and morphology, etc. However, since such a technique using visual observation requires a great deal of work and time for cell analysis, a feasible number of cells for analysis is limited to be small and the analyst suffers from a great fatigue.

On the other hand, as in the cell-image analyzing apparatus according to the present invention, if there is provided a cell-contour emphasizing system 3 for automatically emphasizing contour portions of images of cells 5 that exist in a vessel 4, which is arranged at the shot position of the cell imaging system 1, an image with distinct contours of the individual cells 5 can be obtained and thus, in an automatic analysis of the image captured via the cell imaging system 1, cell contours can be determined and the individual cells are accurately recognizable.

Therefore, in a case where an analysis is made without using a stain such as a fluorescent substance in a bright-field condition or where cells as living are analyzed, the cell-image analyzing apparatus of the present invention makes it possible to automatically conduct the procedure from imaging through recognition of the cells without using visual observation via human eyes, to thereby greatly save fatigue of the analyst and the time for processing, increase the number of cells to be analyzed per unit time, and further, to conduct the cell analysis accurately.

Next, the explanation is made on the embodiment mode of the cell-image analyzing apparatus according to the present invention.

Figure 2:
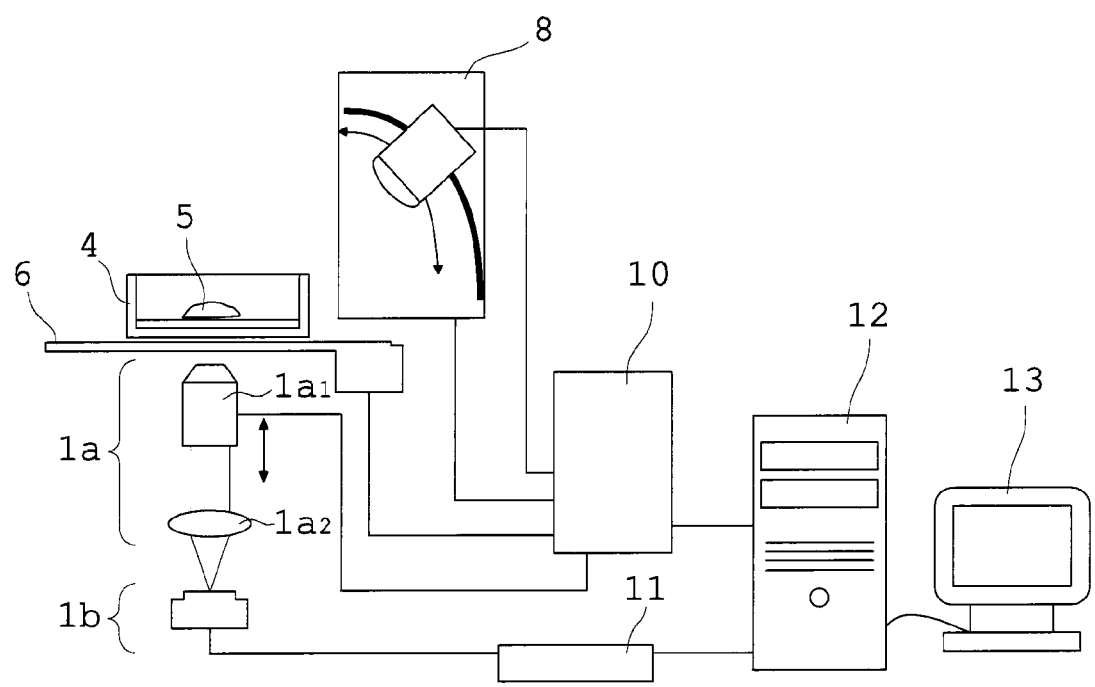
FIG. 2. is an explanatory diagram that shows the schematic configuration of the entire cell-image analyzing apparatus according to one embodiment mode of the present invention.

FIG. 2. is an explanatory diagram that shows the schematic configuration of the entire cell-image analyzing apparatus according to one embodiment mode of the present invention. The cell-image analyzing apparatus of this embodiment mode is configured so that the cell imaging system 1 shown in FIG. 1 has a microscope imaging optical system 1a provided with an objective $1a_1$ and a tube lens $1a_2$, and a solid-state image sensor 1b such as a CCD or CMOS. The objective $1a_1$ is configured to be movable in the direction of the optical axis for focusing by an electric control mechanism not shown. The tube lens $1a_g$ forms an image of the cells 5 that exist in the vessel 4 on an image capture surface of the solid-state image sensor 1b. The cell imaging system 1 images the cells existing in the vessel 4, which is arranged at the shot position.

The cell-image analyzer 2 is configured to have a central processor unit of a personal computer 12 and an image-analyzing software installed there, to automatically analyze a predetermined characteristic quantity on the cells 5 using an image of the cells 5 captured via the cell imaging system 1, upon delimiting regions of the cells 5.

In FIG. 2, the reference numeral 6 denotes an electric XY stage, which mounts the vessel 4 and operates upon receiving power supply and operation instruction from a controller 10 described later. The reference numeral 8 denotes an illumination light source for illuminating the cells 5. The reference numeral 10 denotes a controller, which controls the electric XY stage 6, the illumination light source 8, and the objective $1a_1$ in accordance with instructions from the personal computer 12. The reference numeral 11 denotes a camera controller, which is connected with the solid-state image sensor 1b and the personal computer 12, to perform imaging control and transmission of captured image information to the personal computer 12 upon receiving predetermined instruction signals from the personal computer 12. The reference numeral 13 denotes a monitor connected with the personal computer 12.

Also, in the cell-image analyzing apparatus of this embodiment, the cell-contour emphasizing system 3 shown in FIG. 1 includes a cell-contour emphasizing position focusing system 3a and a cell-contour emphasizing illumination system 3b.

The cell-contour emphasizing position focusing system 3a includes an autofocusing mechanism not shown in FIG. 2 and an electric control mechanism not shown, which is connected with the controller 10. The cell-contour emphasizing position focusing system 3a is configured to move the objective 1$a_1$ in a direction of the optical axis so that, when a predetermined instruction signal is transmitted from the computer 12 to the controller 10, the focus of the imaging optical system 1a is automatically adjusted to the preset position where images of the contour portions of the cells 5 that exist in the vessel 4, which is positioned at the shot position of the cell imaging system 1, are emphasized.

To be specific, the cell-contour emphasizing position focusing system 3a first conducts an autofocusing process for adjusting the focus of the imaging optical system 1a to an intracellular organelle of a cell 5, and then conducts a process of shifting the focus of the imaging optical system 1a in the direction of the optical axis by a preset offset amount so that images of the contour portions of the cells 5 are emphasized.

The cell-contour emphasizing illumination system 3b is configured as a tilted illumination system 8. The tilted illumination system 8 irradiates the cells 5 with illumination light as obliquely tilted in reference to the optical axis of the imaging optical system 1a so that the contour portions of the images of the cells 5 that exist in the vessel 4, which is arranged at the shot position of the cell imaging system 1, are emphasized. In addition, the tilted illumination system 8 is configured to provide an illumination mode in which R, G, B components of illumination light are sequentially switched to one another via a control by the controller 10.

Figure 3:
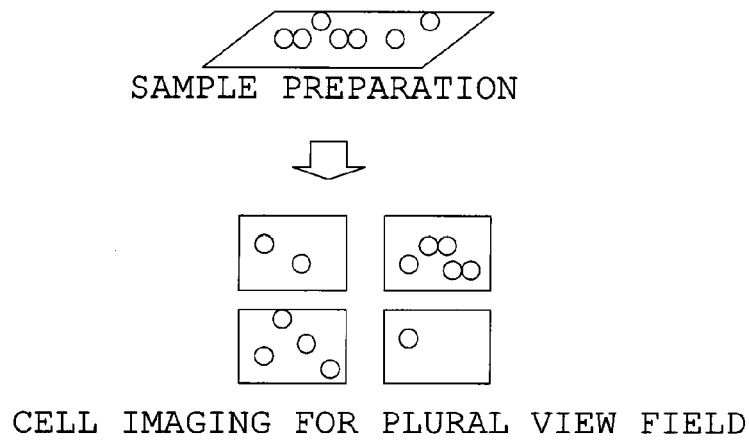
FIG. 3. is an explanatory diagram that schematically shows the entire procedure of cell analysis.

FIG. 3. is an explanatory diagram that schematically shows the entire procedure of cell analysis.

In a cell analysis, first, a cell sample as an object of the analysis is prepared. Then, the cell sample is imaged upon segmented into plural view fields. Then, the individual captured images are analyzed so that plural cells appearing in each image are recognized upon divided into individual cell regions. Then, regarding the individual cells for which their regions are recognized, a predetermined statistical processing such as averaging of cell size (area) is conducted.

In a case where a cell analysis is made using the cell-image analyzing apparatus of this embodiment mode, an analyst puts the cells 5 in the vessel 4 such as a multiwell plate, a slide glass etc., mounts the vessel 4 containing the cells 5 on the electric XY stage 6, and actuates the cell-image analyzing apparatus. Consequently, the electric XY stage 6 conveys the vessel 4 to the shot position of the cell imaging system 1 via the controller 10. Then, via the controller 10 and the camera controller 11, the cell imaging system 1 performs imaging of the cells existing in the vessel 4, which has been conveyed to the shot position, upon dividing the entire field into plural view fields. In the imaging, an autofocusing process by the autofocusing mechanism to adjust the focus of the imaging optical system 1a to an intracellular organelle, a process of shifting the focus of the imaging optical system 1a for emphasizing images of contour portions of the cells 5, and an imaging process under the respective R, G, B components of illumination light, are performed in this order.

Upon completion of the imaging procedure on the cells for every visual field, the cell-image analyzer 2 recognizes regions of individual cells in the image of the cells 5, and then conducts a statistical procedure regarding the individual cells for which their cell regions are recognized, based on parameters that have been preliminarily set via analysts, such as total number of cells, average cell size (area), and total amount of fluorescence of individual cells.

Here, explanation is made on causes that have conventionally prevented analysts from accurately performing automatic analysis of cells using an image analyzing apparatus.

Figure 13A:
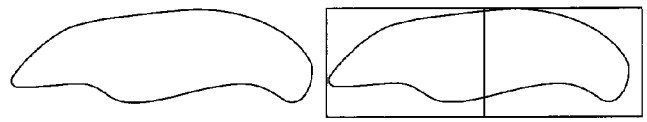
FIGS. 13A-13B are explanatory diagrams that show examples of misrecognition of cell regions, which has conventionally been caused in a cell-image analysis using an image analyzing apparatus, showing: a case where a single cell is recognized as plural cells; and a case where plural cells are recognized as a single cell; respectively.
Figure 13B:
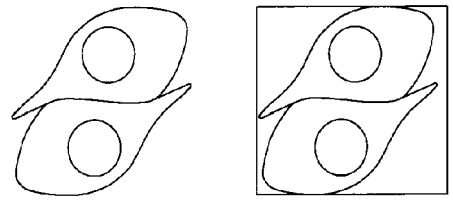

In order to perform automatic analysis of cells accurately using an image analyzing apparatus, it is necessary to delimit regions of individual cells so that the individual cells are accurately recognized in an image analysis of a cell image. However, in such a case where cell analysis is automatically conducted from a cell image using an image analyzing apparatus, there have been a problem that regions of individual cells are often misrecognized, e.g. a single cell being misrecognized as plural cells as shown in FIG. 13A or plural cells being misrecognized as a single cell as shown in FIG. 13B.

The frequency of misrecognition of cell regions differs by morphology of cells that are the object of analysis. For example, regarding cells such as cell nuclei having a relatively regular morphology, or a circular or elliptical shape, it is relatively easy to recognize individual cells. On the other hand, regarding cells such as cytoplasm or cell membranes having an unstructed morphology, recognition of individual cells often is difficult. Such cells having an unsturcted morphology can be classified into adherent cells (regular cells) and suspension cells (e.g. blood cells). Of these types of cells, adherent cells adhere to a bottom surface of a vessel or the like, to present a much complicated morphology.

Although it is relatively easy to recognize individual cells regarding cell nuclei as stated above, for the purpose of capturing an image of the cell nuclei that is in such a condition as to allow individual cells to be easily recognizable, it usually is necessary to specifically stain the cell nuclei using a staining substance such as a fluorescent substance. However, a large part of the staining substances such as fluorescent substances used for staining cell nuclei have toxicity and thus cannot be used in a case where cells are observed as living. Therefore, for an analysis of living cells, it is necessary to recognize individual cells using an image captured in an unstained condition.

For example, in a case where cytoplasm is to be recognized via a cell-analyzing apparatus using a transmitted image of unstained cells, first, possible borders of cells are extracted as "lines", and then contours of individual cells are determined as selected out of the extracted possible borders of cells, as shown in FIGS. 14A-14B. Here, the extraction of possible borders is made by picking up portions where a difference in luminance is large in the image. For example, in a black and white image, a portion where a contrast between black and white exists appears as a "line". Such a portion is extracted as a possible border of a cell.

In a case where cells are distinctly imaged in a transmitted image, not only cytoplasm, or borders of cells (=cell membrane), but also intracellular organelles are observable. However, in such a case, two many "line" components, which are possible borders of cells, appear as shown in FIG. 15, to make it very difficult to trace borders of individual cells using a cell-analyzing apparatus.

In addition, the nature of a transmitted image does not always allow distinct imaging of cells. As shown in FIGS. 16A-16B, for example, "line" components as possible borders of cells often are fragmented. In such a case, the "line" components have to be joined together using a cell-analyzing apparatus, to restore borders of individual cells. However, if the morphology of cells is much complicated, it is difficult to restore borders of the cells.

Figure 4:
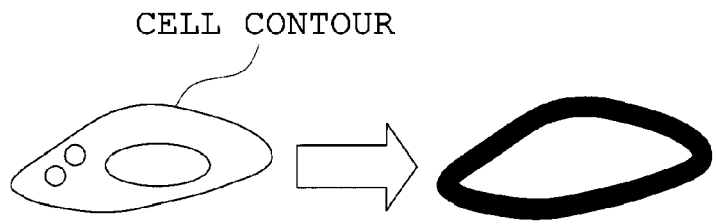
FIG. 4 is an explanatory diagram that shows a state where the contour portion of an image of a cell is emphasized.

In order to solve this problem, the cell-image analyzing apparatus of this embodiment mode is configured to automatically emphasize a contour portion of an image of a cell via a cell-contour emphasizing system 3, as shown in FIG. 4.

Figure 5A:
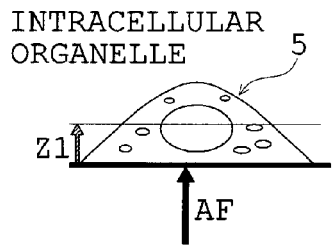
FIGS. 5A-5B are explanatory diagrams that show one example of the method for emphasizing the contour portion of an image of a cell by the cell-contour emphasizing position focusing system of the cell-contour emphasizing system in the cell-image analyzing apparatus according to this embodiment mode, showing: a state where the focus of the imaging optical system is adjusted to the bottom surface of the vessel and then an offset value is set so that the focus is shifted to an intracellular organelle; and a state where the focus of the imaging optical system is adjusted to the bottom surface of the vessel and then an offset value is set so that the focus is shifted to the cell contour; respectively.
Figure 5B:
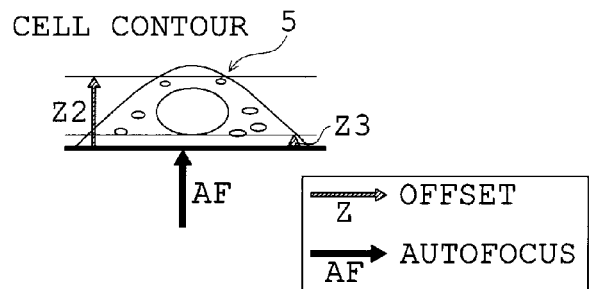

FIGS. 5A-5B are explanatory diagrams that show one example of the method for emphasizing the contour portion of an image of a cell by the cell-contour emphasizing position focusing system $3a$ of the cell-contour emphasizing system 3 in the cell-image analyzing apparatus according to this embodiment mode. To be specific, FIG. 5A is a diagram that shows a state where the focus of the imaging optical system is adjusted to the bottom surface of the vessel and then an offset value is set so that the focus is shifted to an intracellular organelle, and FIG. 5B is a diagram that shows a state where the focus of the imaging optical system is adjusted to the bottom surface of the vessel and then an offset value is set so that the focus is shifted to the cell contour.

Figure 6:
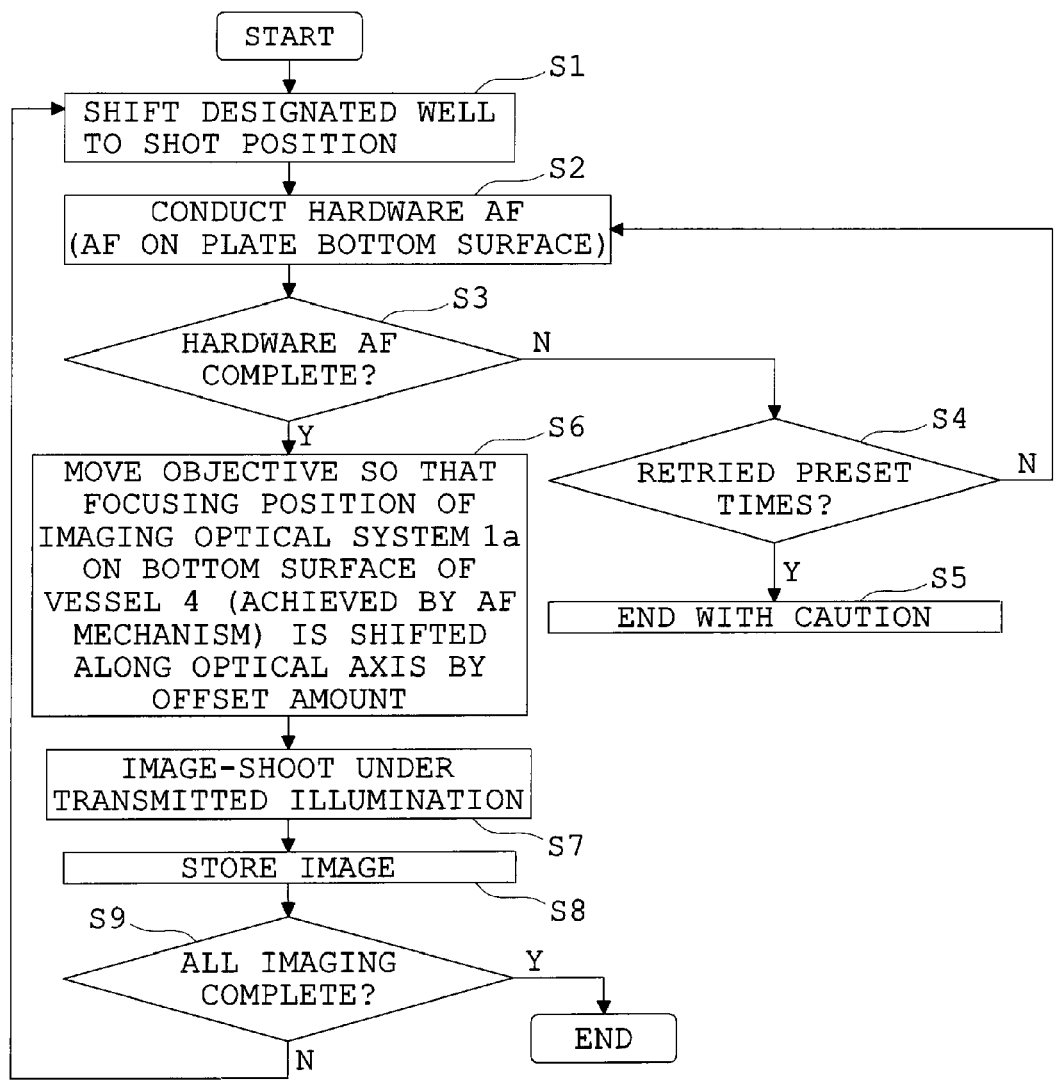
FIG. 6 is a flowchart that shows a series of processes of capturing an image with contour portions of images of cells being emphasized via the cell-contour emphasizing position focusing system of the cell-contour emphasizing system in the cell-image analyzing apparatus according to this embodiment mode.
Figure 7:
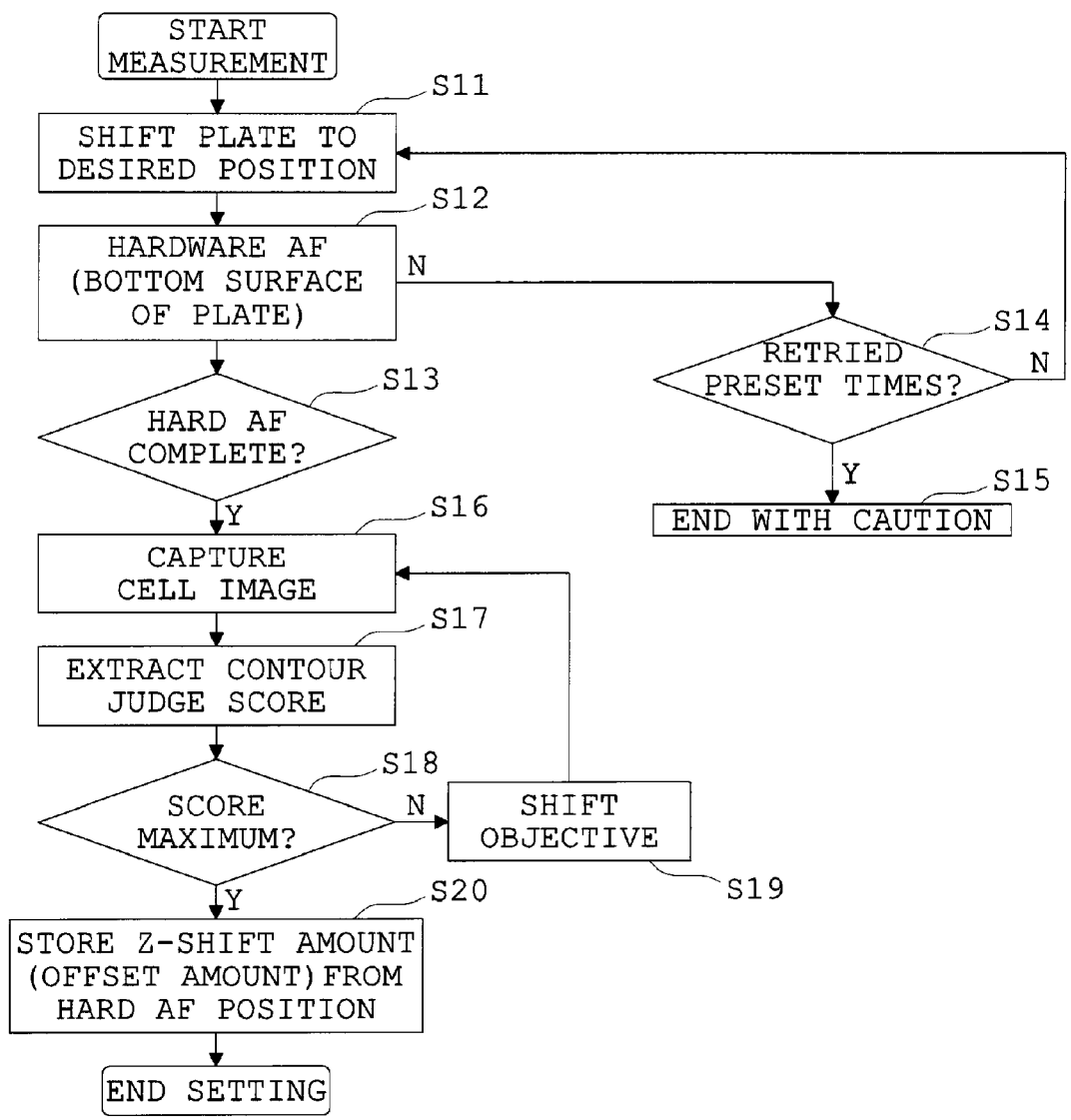
FIG. 7 is a flowchart that shows one example of an automatic setting procedure for an offset value, which is set for shifting the focus of the imaging optical system in the procedure shown in FIG. 6 from the bottom surface of the vessel to a preset position at which the contour portions of the images of the cells are emphasized.

FIG. 6 is a flowchart that shows a series of processes of capturing an image with contour portions of images of cells being emphasized via the cell-contour emphasizing position focusing system $3a$ of the cell-contour emphasizing system 3 in the cell-image analyzing apparatus according to this embodiment mode. FIG. 7 is a flowchart that shows one example of an automatic setting procedure for an offset value, which is set for shifting the focus of the imaging optical system in the procedure shown in FIG. 6 from the bottom surface of the vessel to a preset position at which the contour portions of the images of the cells are emphasized.

Cells adhere to the bottom surface of a vessel, or, if suspension cells, sink to touch the bottom surface. Therefore, first, a position of the bottom surface of the vessel, which contains the cells, in the direction of the optical axis is detected. The detection can be made by a mechanical method (for example, a method by measuring an amount of reflection from the bottom surface upon radiating it with laser light). It can be regarded that the individual cells have substantially the same size. Therefore, upon setting a certain amount of shift along the optical axis as an offset amount, imaging of a predetermined cell position can be made (for example, imaging of the bottom portion of a cell with a shift amount Z3 (see FIG. 5B), the upper portion of the cell with a shift amount Z2 (see FIG. 5B), and the middle portion of the cell with a shift amount Z1 (see FIG. 5A)).

In the cell-contour emphasizing position focusing system $3a$ of the cell-contour emphasizing system 3 according to the cell-image analyzing apparatus of this embodiment mode, the shift amounts Z2 and Z3, which are amounts of shift of the focus of the imaging optical system $1a$ in the direction of the optical axis from the bottom surface of the vessel, are defined as offset amounts, so that the focus of the imaging optical system $1a$ is adjusted to the bottom or the upper portion of the cell as shown in FIG. 5B.

FIG. 6 show a series of processes of capturing an image with contour portions of images of cells being emphasized via the cell-contour emphasizing position focusing system $3a$ of the cell-contour emphasizing system 3 in the cell-image analyzing apparatus according to this embodiment mode.

First, an analyst puts the vessel 4 containing cells on an electric XY stage 6 and actuates the cell-image analyzing apparatus. Consequently, the electric XY stage 6 conveys the vessel 4 to the shot position of the cell imaging system 1 (step S1).

Then, the autofocusing mechanism repeatedly performs hardware AF (autofocusing), in which the objective $1a_1$ of the imaging optical system $1a$ is shifted in the direction of the optical axis, until the focus of the imaging optical system $1a$ is adjusted to the bottom surface of the vessel 4 (step S2 through step S4). If preset times of trials of the hardware AF yet fail to achieve focusing onto the bottom surface of the vessel 4, the procedure is ended with a caution (step S5).

Then, on the basis of a preset offset value, which has been set, for example, through an offset setting procedure described later in reference to FIG. 7 and stored in a storage area of the personal computer 12, the objective $1a_1$ of the imaging optical system $1a$ is moved so that the focusing position of the imaging optical system $1a$ on the bottom surface of the vessel 4, which has been achieved by autofocusing via the autofocusing mechanism, is shifted in the direction of the optical axis by this offset amount (step S6).

Then, the cell imaging system 1 captures a transmitted illumination image of the cells 5 contained in the vessel 4, which is arranged at the shot position (step S7).

Then, the captured image is stored in the storage area of the personal computer 12 (step S8).

The sequence from the conveyance of the vessel 4 to the shot position of the cell imaging system 1 (step 1) through the storage of the captured image in a predetermined storage area (step 8) is performed for every imaging region of the cells (step 9).

Regarding the offset amount, if an average thickness of cells is known in advance, this average thickness can be manually set. Preferably, automatic setting of an offset value is available in the cell-image analyzing apparatus of this embodiment mode.

FIG. 7 shows one example of the procedure for automatically setting the offset amount on the basis of captured cell images.

First, an analyst puts the vessel 4 containing cells on the electric XY stage 6 and actuates the cell-image analyzing apparatus. Consequently, the electric XY stage 6 conveys the vessel 4 to the shot position of the cell imaging system 1 (step S11).

Then, the autofocusing mechanism repeatedly performs hardware AF (autofocusing), in which the objective $1a_1$ of the imaging optical system $1a$ is shifted in the direction of the optical axis, until the focus of the imaging optical system $1a$ is adjusted to the bottom surface of the vessel 4. (step S12 through step S14). If preset times of trials of the hardware AF yet fail to achieve focusing onto the bottom surface of the vessel 4, the procedure is ended with a caution (step S15).

Then, the cell imaging system 1 captures a transmitted illumination image of the cells 5 contained in the vessel 4, which is arranged at the shot position (Step 16).

Then, the cell-image analyzer 2 extracts contours as possible cell borders from the captured image, and performs a predetermined score judgment in accordance with the number of the contours. For example, when the number of contours having a certain contrast is decreased, a high score is counted (step 17). The cell-image analyzing apparatus repeats a sequence of moving the objective $1a_1$ of the imaging optical system $1a$ by a preset amount in the direction of the optical axis (step S19), imaging the cells 5 by the cell imaging system 1 (step S16), and performing the predetermined score judgment upon extracting the cell contours (step S17) until the score of extracted contours counts to the maximum value (step S18).

When the score of extracted contours counts to the maximum value (step S18), the cell-image analyzing apparatus stores the shift amount (offset amount) of the focusing position of the imaging optical system $1a$ in the direction of the optical axis from that at the bottom surface of the vessel 4, which has been achieved by autofocusing via the autofocusing mechanism, in the storage area of the personal computer 12 (step S20). Whereby, the automatic setting procedure for the offset amount is ended in the cell-image analyzing apparatus of this embodiment mode.

Regarding transmitted images, characteristics of images differ in accordance with the focusing position of the imaging optical system $1a$ in reference to the cells 5. For example, the characteristics of images differ as shown in FIGS. 8A-8C and FIGS. 9A-9B.

Figure 8A:
FIGS. 8A-8C are photographs that show a relation between a focusing position of the imaging optical system in reference to cells and a state and result of recognition of cell contours by the cell-image analyzer, showing: a state of recognition (left-side photo) and a result of the recognition (right-side photo) in a condition where the focus of the imaging optical system is positioned on the contours of the cells; a state of recognition (left-side photo) and a result of the recognition (right-side photo) in a condition where the focus of the imaging optical system is positioned on an intracellular organelle; and a state of recognition (left-side photo) and a result of the recognition (right-side photo) in a condition where the focus of the imaging optical system is positioned on an intracellular organelle; respectively.
Figure 8B:
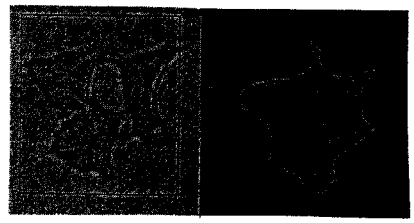
Figure 8C:

FIGS. 8A-8C are photographs that show a relation between the focusing position of the imaging optical system 1a in reference to the cells 5 and a state and result of recognition of cell contours by the cell-image analyzer 2. To be specific, FIG. 8A shows a state of recognition (left-side photo) and a result of the recognition (right-side photo) in a condition where the focus of the imaging optical system 1a is positioned on the contours of the cells 5, FIG. 8B shows a state of recognition (left-side photo) and a result of the recognition (right-side photo) in a condition where the focus of the imaging optical system 1a is positioned on an intracellular organelle of the cells 5, and FIG. 8C shows a state of recognition (left-side photo) and a result of the recognition (right-side photo) in a condition where the focus of the imaging optical system 1a is positioned on an intracellular organelle of the cells 5.

Figure 9A:
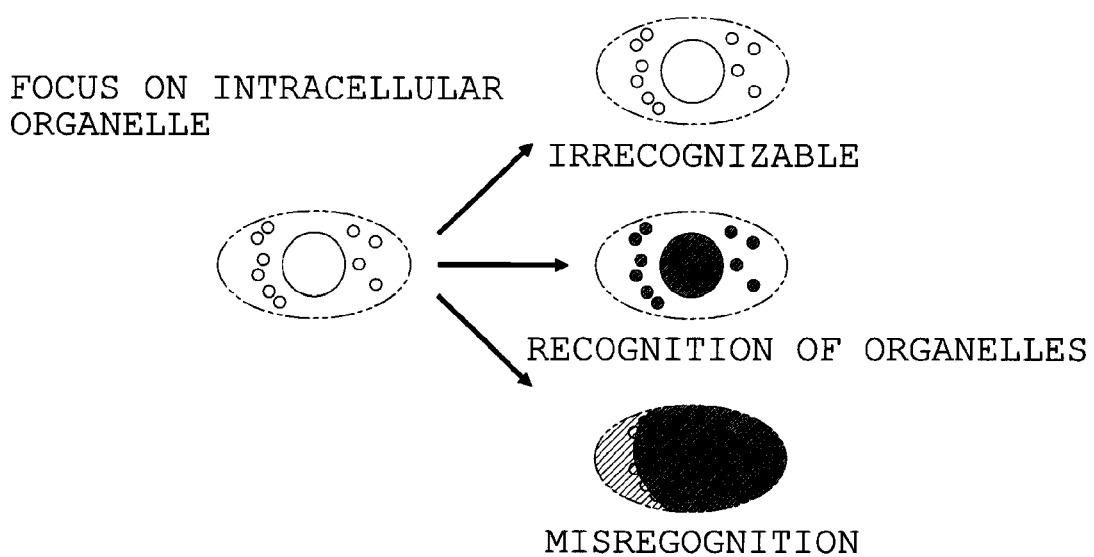
FIGS. 9A-9B are diagrams that schematically show the relation between a focusing position of the imaging optical system in reference to cells and recognition of cell contours by the cell-image analyzer, showing: a state where the focus of the imaging optical system is positioned on an intracellular organelle (left-side drawing) and recognitions of cell contours by the cell-image analyzer in this state (right-side drawings); and a state where the focus of the imaging optical system is positioned on a cell-contour emphasizing point and a recognition of a cell contour by the cell-image analyzer in this state (right-side drawing); respectively.
Figure 9B:
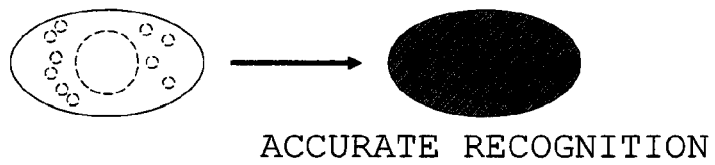

FIGS. 9A-9B are diagrams that schematically show the relation between a focusing position of the imaging optical system 1a in reference to the cells 5 and recognition of cell contours by the cell-image analyzer 2. To be specific, FIG. 9A shows a state where the focus of the imaging optical system is positioned on an intracellular organelle (left-side drawing) and recognitions of cell contours by the cell-image analyzer in this state (right-side drawings), and FIG. 9B shows a state where the focus of the imaging optical system is positioned on a cell-contour emphasizing point and a recognition of a cell contour by the cell-image analyzer in this state (right-side drawing).

When the focus of the imaging optical system 1a is positioned on an intracellular organelle, it is so difficult to recognize border regions of cells accurately that an attempt to recognize cell contours via the cell-image analyzer 2 often fails, as shown in FIGS. 8B, 8C and 9A. To be specific, a cell is irrecognizable (right-side top drawing of FIG. 9A), individual organelles are recognized (FIG. 8C, right-side middle drawing of FIG. 9A), or border regions are misrecognized (FIG. 8B, right-side bottom drawing of FIG. 9A).

Regarding the technique of capturing an image in a condition where contour portions of images of cells are emphasized via the cell-contour emphasizing position focusing system 3a of the cell-contour emphasizing system 3 in the cell-image analyzing apparatus of this embodiment mode, there are another methods for relatively emphasizing contour portions of cells, other than the technique described above in which the focusing position of the imaging optical system 1a is shifted by a certain offset amount.

Figure 10A:
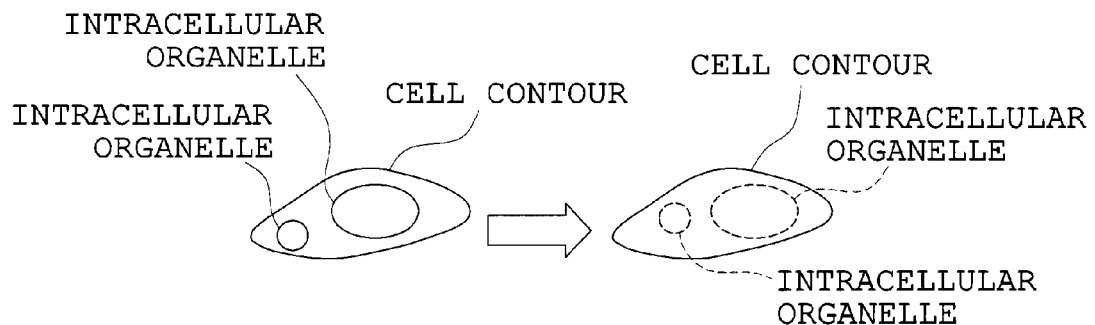
FIGS. 10A-10B are explanatory diagrams that show the state where the focus of the imaging optical system is adjusted to a position different from positions of intracellular organelles, in another method for capturing a cell image with a contour portion of an image of the cell being emphasized via the cell-contour emphasizing position focusing system of the cell-contour emphasizing system in the cell-image analyzing apparatus according to this embodiment mode, showing: a state in which the focus of the imaging optical system is adjusted to a position where images of intracellular organelles are blurred; and a state in which the focus of the imaging optical system is adjusted to a position where an image of the entire cell is blurred; respectively.
Figure 10B:
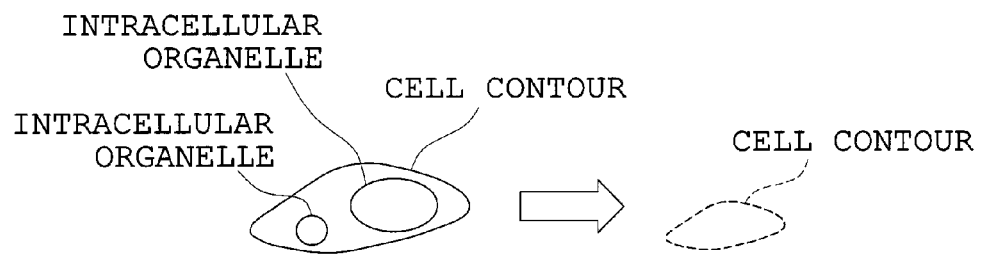

For example, as shown in FIGS. 10A-10B, there is a technique of making intracellular organelles inconspicuous by focusing the imaging optical system 1a on a position displaced from the intracellular organelles. When the objective $1a_1$ is shifted in the direction of the optical axis by a certain amount so that the imaging optical system 1a is focused on a position different from the intracellular organelles, the intracellular organelles are blurred and rendered inconspicuous as shown in FIG. 10A, to make the contour region of the cell relatively conspicuous. In addition, if the shift amount of the objective $1a_1$ is increased, the image of the entire cell comes to be blurred as shown in FIG. 10B. However, since a cell has a certain thickness, it is possible to recognize the contour of the cell.

Either of the above-described techniques, that is, the technique in which the objective $1a_1$ is moved by an offset amount or the technique in which the imaging optical system 1a is focused on a position other than a position of intracellular organelles, is available for emphasizing cell contours upon the focus being set at a position other than the normally used position (i.e. the position where the intracellular domain is in focus).

Also, in the cell-image analyzing apparatus of this embodiment mode, the cell-contour emphasizing system 3 is provided with a cell-contour emphasizing illumination system 3b as a second means for emphasizing contour portions of cells, to perform tilted illumination for the cells 5 in the vessel 4, which is arranged at the shot position. If the tilted illumination is adopted, an adjustment of the illumination angle can make the contours of the cells 5 emphasized, by itself or in a combination with a change of the focusing position of the imaging optical system 1a. In short, the tilted illumination is an illumination technique for making an object conspicuous by casting a "shadow". The size of the shadow correlates to the "height" of an illumination object.

Figure 11:
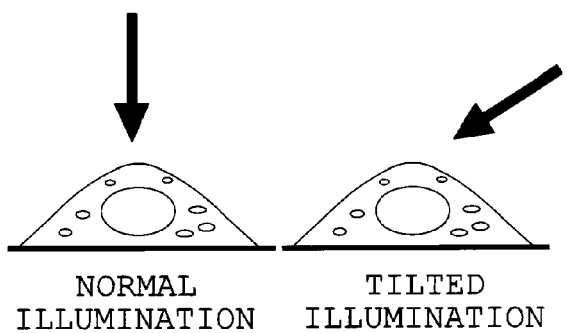
FIG. 11 is an explanatory diagram that schematically shows the normal illumination and the tilted illumination for a cell.
Figure 12A:
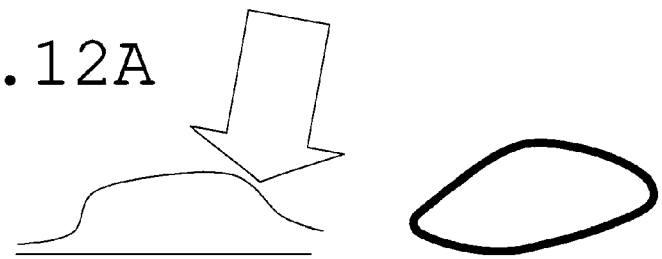
FIGS. 12A-12B are explanatory diagrams that schematically show how the shadow of the contour portion of a cell is cast when the illumination angle is changed in a tilted illumination via the cell-contour emphasizing illumination system in the cell-image analyzing apparatus of this embodiment mode, showing: an illumination condition where the tilt angle is small and a shadow of the cell contour cast in this condition; and an illumination condition where the tilt angle is large and a shadow of the cell contour cast in this condition; respectively.
Figure 12B:
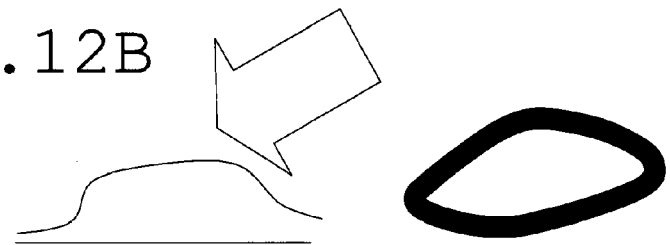

Therefore, in the cell-image analyzing apparatus of this embodiment mode, tilted illumination is performed via the cell-contour emphasizing illumination system 3b, to emphasize the contour portions of the cells 5 on the basis of the principle that a shadow grows as an illumination angle increases. To be specific, since the contour portions of the cells are higher than intracellular organelles, when the cells are illuminated under the tilted illumination, the contour portions of the cells are emphasized as casting shadows like black rings. FIG. 11 is an explanatory diagram that schematically shows the normal illumination and the tilted illumination for a cell. FIGS. 12A-12B are explanatory diagrams that schematically show how the shadow of the contour portion of a cell is cast when the illumination angle is changed in a tilted illumination via the cell-contour emphasizing illumination system 3b in the cell-image analyzing apparatus of this embodiment mode. To be specific, FIG. 12A shows an illumination condition where the tilt angle is small and a shadow of the cell contour cast in this condition, and FIG. 12B shows an illumination condition where the tilt angle is large and a shadow of the cell contour cast in this condition.

In this way, when a cell-contour emphasizing operation is performed by the cell-contour emphasizing position focusing system 3a and the cell-contour emphasizing illumination system 3b in the cell-contour emphasizing system 3 of the cell-image analyzing apparatus of this embodiment mode, cell contours are emphasized as thickened and intracellular organelles are blurred to be relatively inconspicuous. As a result, in the detection process in which "line" components are detected via the cell-image analyzer 2 out of the captured image, the contour portions of the cells are easily detected while the above-described problems, or fragmentation of contour regions and detection of too many possible contours are obviated, to facilitate accurate recognition of the individual cells. Therefore, the cell-image analyzing apparatus of this embodiment mode makes it possible to automatically recognize individual cells accurately when used for cell images captured in an unstained, bright-field condition or for cell images captured from cells as living, to thereby greatly save fatigue of an analyst and time for processing in a cell analysis procedure.

As is clear from the explanations above, the cell-image analyzing apparatus according to the present invention is useful in the fields of medical science and biology, where cells are imaged and characteristic quantities of the cells are analyzed from the captured image of the cells.

What is claimed is:
1. A cell-image analyzing apparatus comprising:
a cell imaging system comprising (i) an imaging optical system for forming an optical image of cells that exist in a vessel, and (ii) an image sensor for capturing images of the cells that exist in the vessel by converting the optical image of the cells formed by the imaging optical system into electronic cell image data;

a cell-contour emphasizing system which optically emphasizes contour portions of the cells that exist in the vessel, the vessel being arranged at a shot position of the cell imaging system, such that the contour portions of the cells appear emphasized in the optical image of the cells which is formed by the imaging optical system before the optical image of the cells is converted into the electronic cell image data; and a cell-image analyzer which analyzes a predetermined characteristic quantity of the cells using the electronic cell image data generated by the cell imaging system, upon delimiting cell regions;

wherein the cell imaging system captures the images of the cells that exist in the vessel, with the contour portions of the cells having been emphasized by the cell-contour emphasizing system, and then the cell-image analyzer automatically analyzes the predetermined characteristic quantity of the cells upon delimiting the cell regions using the electronic cell image data in which the contour portions of the cells that exist in the vessel have been automatically emphasized by the cell-contour emphasizing system and captured by the cell imaging system; and wherein the cell-contour emphasizing system comprises a cell-contour emphasizing position focusing system including an autofocusing mechanism for automatically adjusting a focus of the imaging optical system to a position where the contour portions of the cells that exist in the vessel are emphasized in the optical image of the cells.

2. A cell-image analyzing apparatus comprising:

a cell imaging system comprising (i) an imaging optical system for forming an optical image of cells that exist in a vessel, and (ii) an image sensor for capturing images of the cells that exist in the vessel by converting the optical image of the cells formed by the imaging optical system into electronic cell image data;

a cell-contour emphasizing system which optically emphasizes contour portions of the cells that exist in the vessel, the vessel being arranged at a shot position of the cell imaging system, such that the contour portions of the cells appear emphasized in the optical image of the cells which is formed by the imaging optical system before the optical image of the cells is converted into the electronic cell image data; and a cell-image analyzer which analyzes a predetermined characteristic quantity of the cells using the electronic cell image data generated by the cell imaging system, upon delimiting cell regions;

wherein the cell imaging system captures the images of the cells that exist in the vessel, with the contour portions of the cells having been emphasized by the cell-contour emphasizing system, and then the cell-image analyzer automatically analyzes the predetermined characteristic quantity of the cells upon delimiting the cell regions using the electronic cell image data in which the contour portions of the cells that exist in the vessel have been automatically emphasized by the cell-contour emphasizing system and captured by the cell imaging system; and wherein the cell-contour emphasizing system comprises a cell-contour emphasizing illumination system including a light source for illuminating the cells in such a manner that the contour portions of the cells that exist in the vessel are emphasized in the optical image of the cells.

3. The cell-image analyzing apparatus according to claim 1, wherein the cell-contour emphasizing system further comprises a cell-contour emphasizing illumination system including a light source for illuminating the cells in such a manner that the contour portions of the images of the cells that exist in the vessel are emphasized.

4. The cell-image analyzing apparatus according to claim 1, wherein the cell-contour emphasizing position focusing system is configured so that the focus of the imaging optical system is first adjusted to an intracellular domain of the cells that exist in the vessel by the autofocusing mechanism, and then is shifted along an optical axis of the imaging optical system by a preset amount to a position where the intracellular domain of the cells is blurred and the contour portions of the cells are distinctly seen in the optical image of the cells.

5. The cell-image analyzing apparatus according to claim 1, wherein the cell-contour emphasizing position focusing system is configured so that the focus of the imaging optical system is first adjusted to a bottom surface of the vessel by the autofocusing mechanism, and then is shifted along an optical axis of the imaging optical system by a preset amount which is determined in accordance with a thickness of the cells that exist in the vessel.

6. The cell-image analyzing apparatus according to claim 2, wherein the cell-contour emphasizing illumination system comprises a tilted illumination system configured to irradiate the cells with illumination light rays from the light source such that the light rays are obliquely tilted with respect to an optical axis of the imaging optical system and such that the contour portions of the cells are emphasized with cast shadows in the optical image of the cells.

7. The cell-image analyzing apparatus according to claim 3, wherein the cell-contour emphasizing illumination system comprises a tilted illumination system configured to irradiate the cells with illumination light rays from the light source in a manner obliquely tilted with respect to an optical axis of the imaging optical system such that the contour portions of the cells are emphasized with cast shadows in the optical image of the cells.

8. The cell-image analyzing apparatus according to claim 3, wherein the cell-contour emphasizing position focusing system is configured so that the focus of the imaging optical system is first adjusted to an intracellular domain of the cells that exist in the vessel by the autofocusing mechanism, and then is shifted along an optical axis of the imaging optical system by a preset amount to a position where the intracellular domain of the cells is blurred and the contour portions of the cells are distinctly seen in the optical image of the cells.

9. The cell-image analyzing apparatus according to claim 8, wherein the cell-contour emphasizing illumination system comprises a tilted illumination system configured to irradiate the cells with illumination light rays from the light source such that the light rays are obliquely tilted with respect to an optical axis of the imaging optical system and such that the contour portions of the cells are emphasized with cast shadows in the optical image of the cells.

10. The cell-image analyzing apparatus according to claim 3, wherein the cell-contour emphasizing position focusing system is configured so that the focus of the imaging optical system is first adjusted to a bottom surface of the vessel by the autofocusing mechanism, and then is shifted along an optical axis of the imaging optical system by a preset amount which is determined in accordance with a thickness of the cells that exist in the vessel.

11. The cell-image analyzing apparatus according to claim 10, wherein the cell-contour emphasizing illumination system comprises a tilted illumination system configured to irradiate the cells with illumination light rays from the light source such that the light rays are obliquely tilted with respect to an optical axis of the imaging optical system and such that the contour portions of the cells are emphasized with cast shadows in the optical image of the cells.

* * * * *